United States Patent
Park

(10) Patent No.: US 10,552,707 B2
(45) Date of Patent: Feb. 4, 2020

(54) METHODS AND DEVICES FOR IMAGE CHANGE DETECTION

(71) Applicant: QUALCOMM Incorporated, San Diego, CA (US)

(72) Inventor: Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 15/835,322

(22) Filed: Dec. 7, 2017

(65) Prior Publication Data

US 2019/0180137 A1    Jun. 13, 2019

(51) Int. Cl.
*G09G 5/02*      (2006.01)
*G06K 9/00*      (2006.01)
(Continued)

(52) U.S. Cl.
CPC ............. *G06K 9/6202* (2013.01); *G06T 7/11* (2017.01); *G06T 7/194* (2017.01); *G06T 7/20* (2013.01);
(Continued)

(58) Field of Classification Search
USPC ............... 382/100, 103, 106–107, 162, 168, 382/172–173, 181, 190, 199, 220, 232,
(Continued)

(56) References Cited

U.S. PATENT DOCUMENTS 8,237,813 B2    8/2012  Garten
8,346,008 B2    1/2013  Lin
(Continued)

OTHER PUBLICATIONS

Chen T., et al., "An Exposure Guided Background Subtraction for Smart Camera", Proceedings of the First International Conference on Information Sciences, Machinery, Materials and Energy, Jan. 1, 2015 (Jan. 1, 2015), pp. 859-862, XP055404075, Paris, France DOI : 10.2991 /icism me-15.2015.180 ISBN: 978-94-625-2067-7.
(Continued)

*Primary Examiner* — Seyed H Azarian
(74) *Attorney, Agent, or Firm* — QUALCOMM Incorporated

(57) ABSTRACT

Pixel values may be obtained for a scene at two or more exposure levels, each exposure level corresponding to at least one of an exposure time interval different from that of another exposure level or an applied gain different from that of another exposure level. The pixel values may be aggregated into superpixel values, wherein each of the superpixel values includes a plurality of pixel values. A background model corresponding to each exposure level may be obtained. The superpixel values corresponding to each exposure level may be compared with the background model corresponding to each exposure level, to obtain an image change detection result for each exposure level. The image change detection results for each exposure level may be aggregated to obtain a combined image change detection result. A region of interest and/or a background region for the scene may be determined according to the combined image change detection result.

30 Claims, 9 Drawing Sheets

(51) Int. Cl.
 *G06K 9/62* (2006.01)
 *G06T 7/20* (2017.01)
 *G06T 7/194* (2017.01)
 *G06T 7/11* (2017.01)
 *G06T 7/254* (2017.01)
 *G08B 5/22* (2006.01)

(52) U.S. Cl.
 CPC .... *G06T 7/254* (2017.01); *G06T 2207/10144* (2013.01); *G06T 2207/20021* (2013.01); *G06T 2207/30232* (2013.01); *G08B 5/22* (2013.01)

(58) Field of Classification Search
 USPC ....... 382/254, 276, 286–291, 305, 312, 321, 382/221; 345/589
 See application file for complete search history.

(56) References Cited

U.S. PATENT DOCUMENTS

| | | | |
|---|---|---|---|
| 8,478,076 B2 | 7/2013 | Mathew | |
| 8,559,676 B2 * | 10/2013 | Hildreth | G06F 3/017 382/107 |
| 8,737,755 B2 | 5/2014 | Prentice | |
| 9,160,936 B1 | 10/2015 | Rivard et al. | |
| 2008/0166022 A1 * | 7/2008 | Hildreth | G06F 3/017 382/107 |
| 2012/0081385 A1 * | 4/2012 | Cote | H04N 5/23219 345/589 |
| 2016/0092736 A1 * | 3/2016 | Mai | G06K 9/00624 |
| 2017/0064211 A1 | 3/2017 | Omid-Zohoor | |
| 2017/0094194 A1 * | 3/2017 | Adsumilli | H04N 5/272 |
| 2017/0256067 A1 | 9/2017 | Yamada et al. | |

OTHER PUBLICATIONS

International Search Report and Written Opinion—PCT/US2018/063940—ISA/EPO—dated Feb. 22, 2019.

Zhang W et al., "Motion-Free Exposure Fusion Based on Interconsistency and Intra-Consistency", Information Sciences, Amsterdam, NL, vol. 376, Oct. 15, 2016 (Oct. 15, 2016), pp. 190-201, XP029786996, ISSN: 0020-0255, DOI: 10.1016/J.INS.2016.10.020.

* cited by examiner

METHODS AND DEVICES FOR IMAGE CHANGE DETECTION

TECHNICAL FIELD

This disclosure relates generally to image processing, including but not limited to devices and methods for image change detection.

DESCRIPTION OF THE RELATED TECHNOLOGY

Background subtraction (also known as foreground detection) is a method for distinguishing the background of an image from one or more areas in which the image has changed. Background subtraction may be based on detected image changes between a current frame and a reference frame, which may be called a "background model." Image change detection may be used for detecting moving objects in a video stream, such as a video stream from a security camera.

SUMMARY

The systems, methods and devices of the disclosure each have several innovative aspects, no single one of which is solely responsible for the desirable attributes disclosed herein.

One innovative aspect of the subject matter described in this disclosure can be implemented in a method of image change detection. The method may involve obtaining pixel values for at least a portion of a scene at two or more exposure levels. Each exposure level may correspond to an exposure time interval different from that of another exposure level and/or an applied gain different from that of another exposure level. In some examples, the method may involve aggregating the pixel values into superpixel values. Each of the superpixel values may include a plurality of pixel values.

In some examples, the method may involve obtaining a background model corresponding to each exposure level. The background model may correspond to at least part of the scene. According to some implementations, the method may involve comparing the superpixel values corresponding to each exposure level with the background model corresponding to each exposure level, to obtain an image change detection result for each exposure level. In some instances, the method may involve aggregating the image change detection results for each exposure level to obtain a combined image change detection result. According to some examples, the method may involve determining at least one region of interest and/or at least one background region for the scene according to the combined image change detection result. In some implementations, the method may involve sending an alarm message and/or an image responsive to the combined image change detection result.

According to some implementations, the determining may involve determining a region of interest. In some such implementations, the method also may involve updating at least one of the exposure levels based, at least in part, on pixel values obtained for the region of interest.

In some examples, obtaining the pixel values may involve obtaining the pixel values from an optical sensor. According to some implementations, obtaining the background model may involve obtaining the background model from a memory device. In some instances, the background model may include at least a portion of a reference frame.

According to some examples, obtaining the image change detection result for at least one of the exposure levels may involve using only a portion of a total number of superpixel values for a corresponding exposure level. In some implementations, the method may involve obtaining salient region data regarding one or more regions of the scene and adjusting at least one exposure level according to the salient region data. Obtaining the salient region data may, for example, involve obtaining at least one of ambient light intensity information or region of interest information.

In some instances, the method may involve updating at least a portion of the reference frame based, at least in part, on pixel values obtained for at least a portion of the scene. According to some examples, the method may involve updating at least one of the exposure levels based, at least in part, on pixel values obtained for at least a portion of the scene.

In some examples, obtaining the pixel values may involve obtaining pixel values for at least a portion of the scene at a first exposure level. According to some such examples, the method also may involve determining that pixel values should be obtained at one or more other exposure levels.

Other innovative aspects of the subject matter described in this disclosure can be implemented in an apparatus or a system. The apparatus or system may include an optical sensor and a control system configured for communication with the optical sensor. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The control system may be configured for obtaining, from the optical sensor, pixel values for at least a portion of a scene at two or more exposure levels. Each exposure level may correspond to an exposure time interval different from that of another exposure level and/or an applied gain different from that of another exposure level. According to some examples, the control system may be configured for aggregating the pixel values into superpixel values. Each of the superpixel values may include a plurality of pixel values. In some examples, the control system may be configured for obtaining a background model corresponding to each exposure level. The background model may correspond to at least part of the scene.

According to some implementations, the control system may be configured for comparing the superpixel values corresponding to each exposure level with the background model corresponding to each exposure level, to obtain an image change detection result for each exposure level. In some examples, the control system may be configured for aggregating the image change detection results for each exposure level to obtain a combined image change detection result. In some instances, the control system may be configured for determining at least one region of interest and/or at least one background region for the scene according to the combined image change detection result.

In some instances, the determining may involve determining a region of interest. The control system may be configured for updating at least one of the exposure levels based, at least in part, on pixel values obtained for the region of interest.

According to some examples, the system may include an interface. The control system may be configured for sending, via the interface, at least one of an alarm message or an image responsive to the combined image change detection result.

In some examples, obtaining the image change detection result for at least one of the exposure levels may involve using only a portion of a total number of superpixel values for a corresponding exposure level.

According to some examples, the control system may be configured for obtaining salient region data regarding one or more regions of the scene and adjusting at least one exposure level according to the salient region data. Obtaining the salient region data may, for example, involve obtaining ambient light intensity information and/or region of interest information.

According to some implementations, the system may include a user interface. In some such implementations, obtaining the salient region data may involve receiving the salient region data via the user interface.

In some implementations, the apparatus (e.g., the control system) may include a memory device. According to some such examples, obtaining the background model may involve obtaining the background model from the memory device.

In some examples, the control system may be configured for updating at least one of the exposure levels based, at least in part, on pixel values obtained for at least a portion of the scene. According to some implementations, the control system may be configured for obtaining pixel values for at least a portion of the scene at a first exposure level and for determining that pixel values should be obtained at one or more other exposure levels.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method of image change detection. The method may involve obtaining pixel values for at least a portion of a scene at two or more exposure levels. Each exposure level may correspond to an exposure time interval different from that of another exposure level and/or an applied gain different from that of another exposure level. In some examples, the method may involve aggregating the pixel values into superpixel values. Each of the superpixel values may include a plurality of pixel values.

In some examples, the method may involve obtaining a background model corresponding to each exposure level. The background model may correspond to at least part of the scene. According to some implementations, the method may involve comparing the superpixel values corresponding to each exposure level with the background model corresponding to each exposure level, to obtain an image change detection result for each exposure level. In some instances, the method may involve aggregating the image change detection results for each exposure level to obtain a combined image change detection result. According to some examples, the method may involve determining at least one region of interest and/or at least one background region for the scene according to the combined image change detection result. In some implementations, the method may involve sending an alarm message and/or an image responsive to the combined image change detection result.

According to some implementations, the determining may involve determining a region of interest. In some such implementations, the method also may involve updating at least one of the exposure levels based, at least in part, on pixel values obtained for the region of interest.

In some examples, obtaining the pixel values may involve obtaining the pixel values from an optical sensor. According to some implementations, obtaining the background model may involve obtaining the background model from a memory device. In some instances, the background model may include at least a portion of a reference frame.

According to some examples, obtaining the image change detection result for at least one of the exposure levels may involve using only a portion of a total number of superpixel values for a corresponding exposure level. In some implementations, the method may involve obtaining salient region data regarding one or more regions of the scene and adjusting at least one exposure level according to the salient region data. Obtaining the salient region data may, for example, involve obtaining at least one of ambient light intensity information or region of interest information.

In some instances, the method may involve updating at least a portion of the reference frame based, at least in part, on pixel values obtained for at least a portion of the scene. According to some examples, the method may involve updating at least one of the exposure levels based, at least in part, on pixel values obtained for at least a portion of the scene.

In some examples, obtaining the pixel values may involve obtaining pixel values for at least a portion of the scene at a first exposure level. According to some such examples, the method also may involve determining that pixel values should be obtained at one or more other exposure levels.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
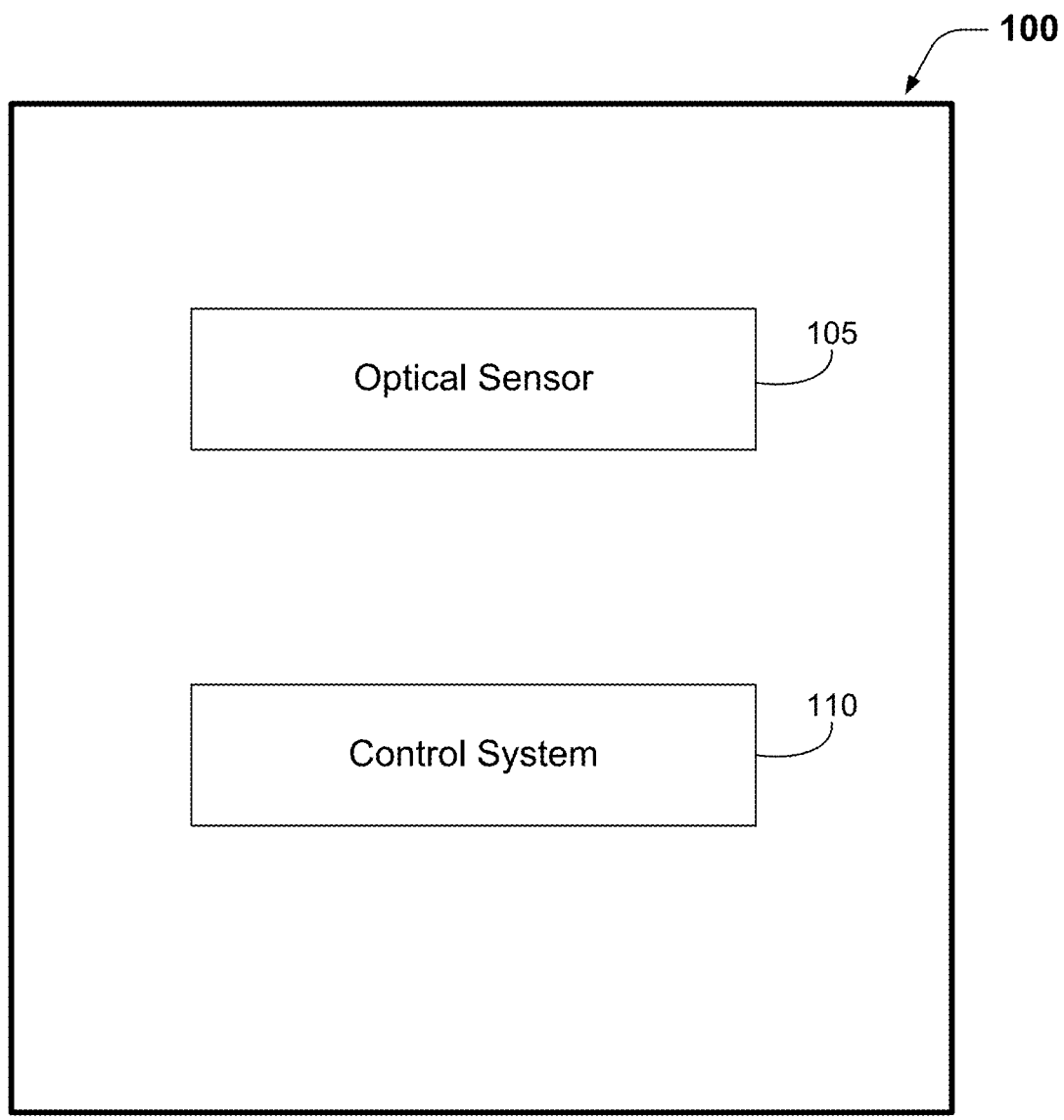
FIG. 1 is a block diagram that shows example components of an apparatus according to some implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes an apparatus or system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Various implementations disclosed herein may include an apparatus that may be configured to obtain image data for a scene at multiple exposure levels. The image data may correspond to optical sensor pixel values and/or superpixel values. As used herein, the term "exposure" may refer to an exposure time interval, an applied gain or a combination of an exposure time interval and an applied gain. In some such examples, an apparatus may be configured to obtain image data for a scene at an "overexposed" level, corresponding to a relatively longer exposure time and/or a relatively larger applied gain. Alternatively, or additionally, an apparatus also may be configured to obtain image data for a scene at an "underexposed" level, corresponding to a relatively shorter exposure time and/or a relatively smaller applied gain.

Particular implementations of the subject matter described in this disclosure can be implemented to realize one or more of the following potential advantages. Additional image changes—as compared to the image changes detected using only one exposure level—may be detected by obtaining image data for the same scene at one or more overexposed and/or underexposed exposure levels. Accordingly, obtaining image data at multiple exposure levels may provide a more reliable image change detection process, particularly if the scene includes a relatively wide range of light intensity. Such methods may be particularly advantageous for outdoor use cases. In many security camera use cases, for example, the sun may be shining on the sensor during some times of day. At the same time, the security camera may be monitoring an area that is in shadow, such as an alley. In many such cases, there is no single exposure setting that will be appropriate for both the bright and dark areas of the scene. Such methods may be particularly beneficial when the images are captured by a low-power optical sensor and/or an optical sensor having a relatively low bit width. This is true in part because a low-power optical sensor or an optical sensor having a low bit width may have a relatively low dynamic range.

It is often the case that an image's region(s) of interest (ROI) are objects (such as humans, animals, cars, etc.) in the image's foreground. As noted above, background subtraction is one method for distinguishing the background from the ROI. Background subtraction may be based, at least in part, on detected image changes between a current frame and a reference frame, which may be called a "background model." Image change detection may be used for detecting moving objects in a video stream, such as a video stream from a security camera, a video stream from a doorbell camera, a video stream from a baby monitor camera, a video stream from a camera associated with a voice-controlled device, etc. (As used herein, the term "camera" may be used to refer to any one of a range of devices having varying capabilities and complexities, including security cameras, simple optical sensors, etc.) For example, a current pixel, or a current group of pixels, may be considered to be part of the foreground if the difference between the current pixel (or the current group of pixels) and a corresponding portion of the background model is greater than or equal to a threshold value.

FIG. 1 is a block diagram that shows example components of an apparatus according to some implementations. In this example, the apparatus 100 includes an optical sensor 105 and a control system 110 that is configured to communicate with the optical sensor 105. The control system 110 may be configured to communicate with the optical sensor 105 via wired communication and/or wireless communication. As used herein, the term "coupled to" includes being physically coupled for wired communication as well as being configured for wireless communication.

According to some implementations, the apparatus 100 may be a single device, whereas in other implementations the apparatus 100 may include more than one device. Accordingly, the terms "apparatus" and "system" may be used interchangeably herein. In other examples, the apparatus 100 may be a component of another device. For example, in some implementations at least a portion of the optical sensor 105 and/or the control system 110 may be included in more than one apparatus. In some examples, a second device may include some or all of the control system 110, but may not include the optical sensor 105. However, the control system 110 may nonetheless be configured to communicate with the optical sensor 105.

The control system 110 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 110 also may include (and/or be configured for communication with) one or more memory devices, such as one or more random access memory (RAM) devices, read-only memory (ROM) devices and/or other types of non-transitory media. Accordingly, the apparatus 100 may have a memory system that includes one or more memory devices, though the memory system is not shown in FIG. 1.

The control system 110 may be capable of performing, at least in part, the methods disclosed herein. In some examples, the control system 110 may be capable of performing some or all of the methods described herein according to instructions (e.g., software) stored on non-transitory media. For example, the control system 110 may be configured for controlling the optical sensor 105 and/or for receiving and processing data from at least a portion of the optical sensor 105, e.g., as described below.

In some examples, the optical sensor 105 may include an image sensor array and one or more lenses. Although shown as separate components in FIG. 1, the optical sensor 105 may, in some examples, include at least a portion of the control system 110. For example, the optical sensor 105 may include one or more processors in some instances. According to some implementations, the optical sensor 105 may include a complementary metal-oxide-semiconductor (CMOS) sensor. Some such implementations of the optical sensor 105 may include a processor configured to control exposure settings. The sensor and the processor may or may not reside on the same die, depending on the particular implementation. In some examples, the optical sensor 105 may be, or may include, Qualcomm's Glance image sensor, one implementation of which has a 320 by 240 array of pixels and an 8-bit width, and consumes milliwatts of power, including the power used by the optical sensor and the power consumed by associated processing. By way of comparison, a camera module in a smartphone generally consumes hundreds of milliwatts of power, or in some cases watts of power.

Although not expressly shown in FIG. 1, some implementations of the apparatus 100 may include an interface system. In some examples, the interface system may include a wireless interface system. In some implementations, the interface system may include a network interface, an interface between the control system 110 and the optical sensor 105, an interface between the control system 110 and a memory system and/or an interface between the control system 110 and an external device interface (e.g., a port or an applications processor). In some examples, the interface system may include one or more user interfaces, such as a display, a touch screen, a microphone, etc.

Image change detection can be particularly challenging when the images are captured by a low-power optical sensor and/or an optical sensor having a relatively low bit width. Due to the power and bit-width limitations of the Glance platform and other simple, low-power optical sensors, the existence of very bright and/or very dark regions on the same image can pose image change detection problems. Such regions may be too bright (or too dark) to allow values above (or below) the background model by a threshold to be detected. There may be no setting of such simple, low-power optical sensors that will provide a sufficient dynamic range for detecting image changes in very bright and/or very dark regions. Therefore, some foreground events may not be detectable by using prior art methods.

Figure 2:
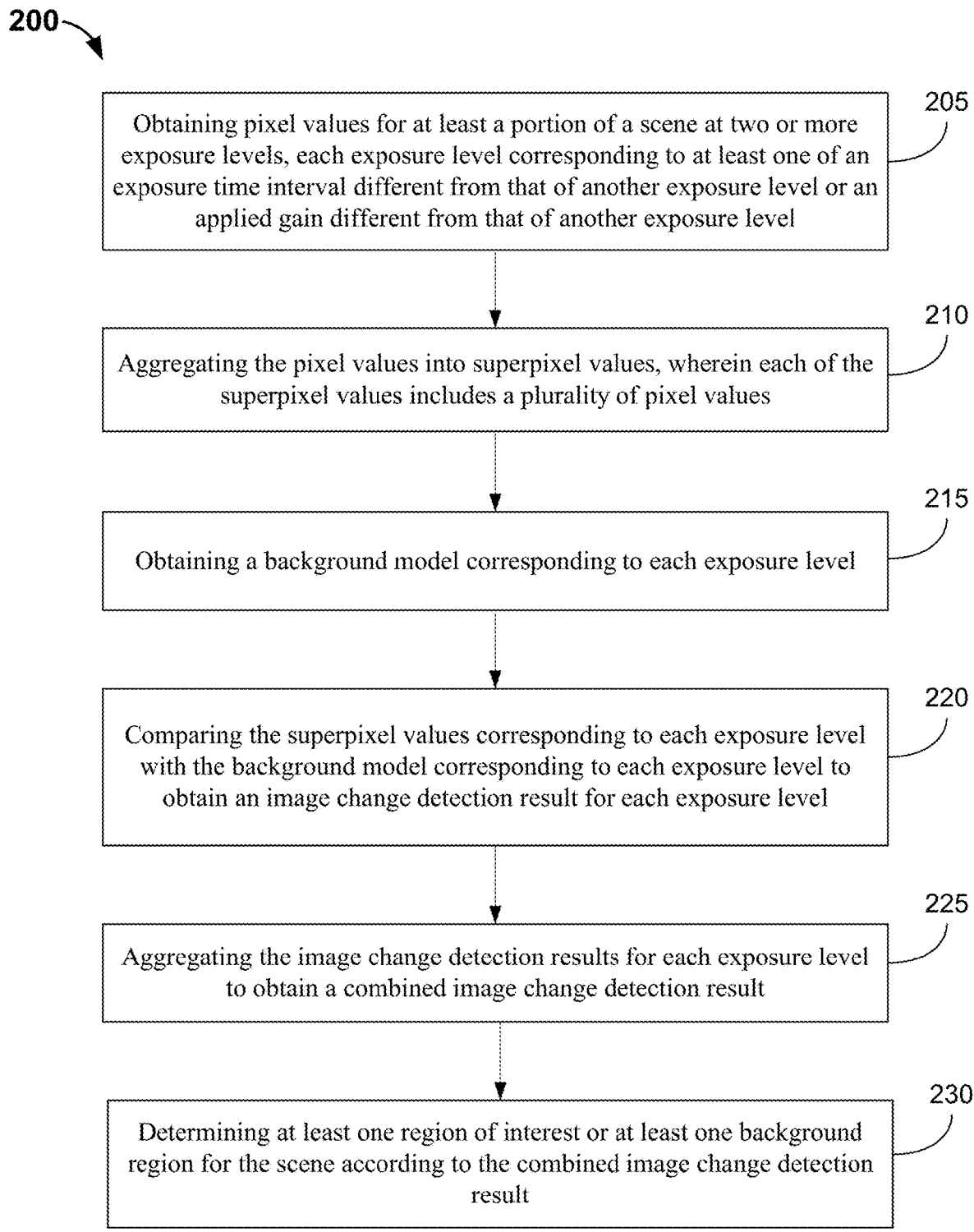
FIG. 2 is a flow diagram that provides examples of operations according to some disclosed methods.

FIG. 2 is a flow diagram that provides examples of operations according to some disclosed methods. The blocks of FIG. 2 (and those of other flow diagrams provided herein) may, for example, be performed by the apparatus 100 of FIG. 1, by a similar apparatus or by a system that includes one or more such devices. As with other methods disclosed herein, the method outlined in FIG. 2 may include more or fewer blocks than indicated. Moreover, the blocks of methods disclosed herein are not necessarily performed in the order indicated.

According to this example, method 200 involves obtaining image data for a scene at two or more exposure levels. As used herein, the term "exposure" may refer to an exposure time interval, an applied gain or a combination of an exposure time interval and an applied gain. In some such examples, an apparatus may be configured to obtain image data for a scene at an "overexposed" level, corresponding to a relatively longer exposure time and/or a relatively larger applied gain. Alternatively, or additionally, an apparatus also may be configured to obtain image data for a scene at an "underexposed" level, corresponding to a relatively shorter exposure time and/or a relatively smaller applied gain. According to some examples, an apparatus may be configured to obtain image data for the scene at an "underexposed" level, corresponding to a relatively shorter exposure time and/or a relatively smaller applied gain, by reading values from an optical sensor at a first time, then allowing the optical sensor to accumulate charge until a second and later time at which image data for a scene at an "overexposed" level, corresponding to a relatively longer exposure time and/or a relatively larger applied gain, are obtained.

The overexposed and underexposed levels may be relative to one or more intermediate exposure levels. In some such examples, there may be three, four, five or more exposure levels. In one such example, the overexposed and underexposed levels are relative to a baseline exposure level, which may correspond with an overall ambient light intensity. For example, in the context of a security camera, the baseline exposure level may be a default or pre-set exposure level that would be automatically selected by the security camera for a particular range of ambient light intensity values. A control system of the security camera may, for example, refer to a look-up table or other data structure that is stored in memory. The data structure may include ambient light intensity values and corresponding exposure level values. The exposure level values may include exposure time interval values and/or applied gain values. However, in some examples there may be more than three exposure levels. Such examples may include multiple intermediate exposure levels between the most overexposed and most underexposed levels.

For some outdoor use cases in sunlight, 200 microseconds or 250 microseconds may be an appropriate baseline exposure time for an optical sensor such as the Glance sensor. In dark areas, an appropriate baseline exposure time may be one or more milliseconds. In very dark areas, an appropriate baseline exposure time may be substantially more than one millisecond, e.g., 10 or 20 milliseconds. In one example having three exposure levels, if a baseline exposure level corresponds with an exposure time interval of one millisecond, an overexposed level may correspond with an exposure time interval that is a multiple of one millisecond, such as two milliseconds or four milliseconds. An underexposed level may correspond with an exposure time interval that is a fraction of one millisecond, such as half a millisecond or a quarter of a millisecond. Alternatively, or additionally, if the baseline exposure level corresponds with a gain of V volts, in some examples the overexposed level may correspond with a gain of 2V or 4V volts and the underexposed level may correspond with a gain of a gain of 0.5V or 0.25V volts.

Accordingly, some implementations may involve overexposing by 2× and/or 4× of a baseline exposure level and underexposing by ½ and/or ¼ of a baseline exposure level. In one example, the exposures may be 4×, 2×, normal, ½ and ¼. Having a greater range of exposures can be particularly useful for outdoor use cases in which there may be a wide range of light intensities, from direct sunlight to shadow. Some examples may involve updating at least one of the exposure levels based, at least in part, on pixel values obtained for at least a portion of the scene. For example, a different range of exposure levels may be appropriate for an outdoor security camera at noon on a sunny day than for the same security camera at dawn, at dusk, or during the nighttime.

In the example shown in FIG. 2, block 205 involves obtaining pixel values for at least a portion of a scene at two or more exposure levels. In this example, each exposure level corresponds to an exposure time interval that is different from that of another exposure level and/or an applied gain that is different from that of another exposure level. In some examples, block 205 may involve a control system, such as the control system 110 of FIG. 1, receiving the pixel values from an optical sensor (such as the optical sensor 105 of FIG. 1). Alternatively, block 205 may involve a control system of an optical sensor, such as the optical sensor 105 of FIG. 1, receiving the pixel values from an image sensor array of the optical sensor.

In some examples, the pixel values of an optical sensor may be aggregated into "superpixels" in order to reduce the computational overhead and memory requirements. Accordingly, the image data used for image change detection may correspond to pixel values or superpixel values, depending on the particular implementation. A superpixel value can be thought of as a proxy for an average pixel intensity in a group of pixels. Accordingly, in this example block 210 involves aggregating the pixel values into superpixel values, wherein each of the superpixel values includes a plurality of pixel values. One example will now be described with reference to FIGS. 3A and 3B.

Figure 3A:
FIG. 3A shows an example of an original image.
Figure 3B:
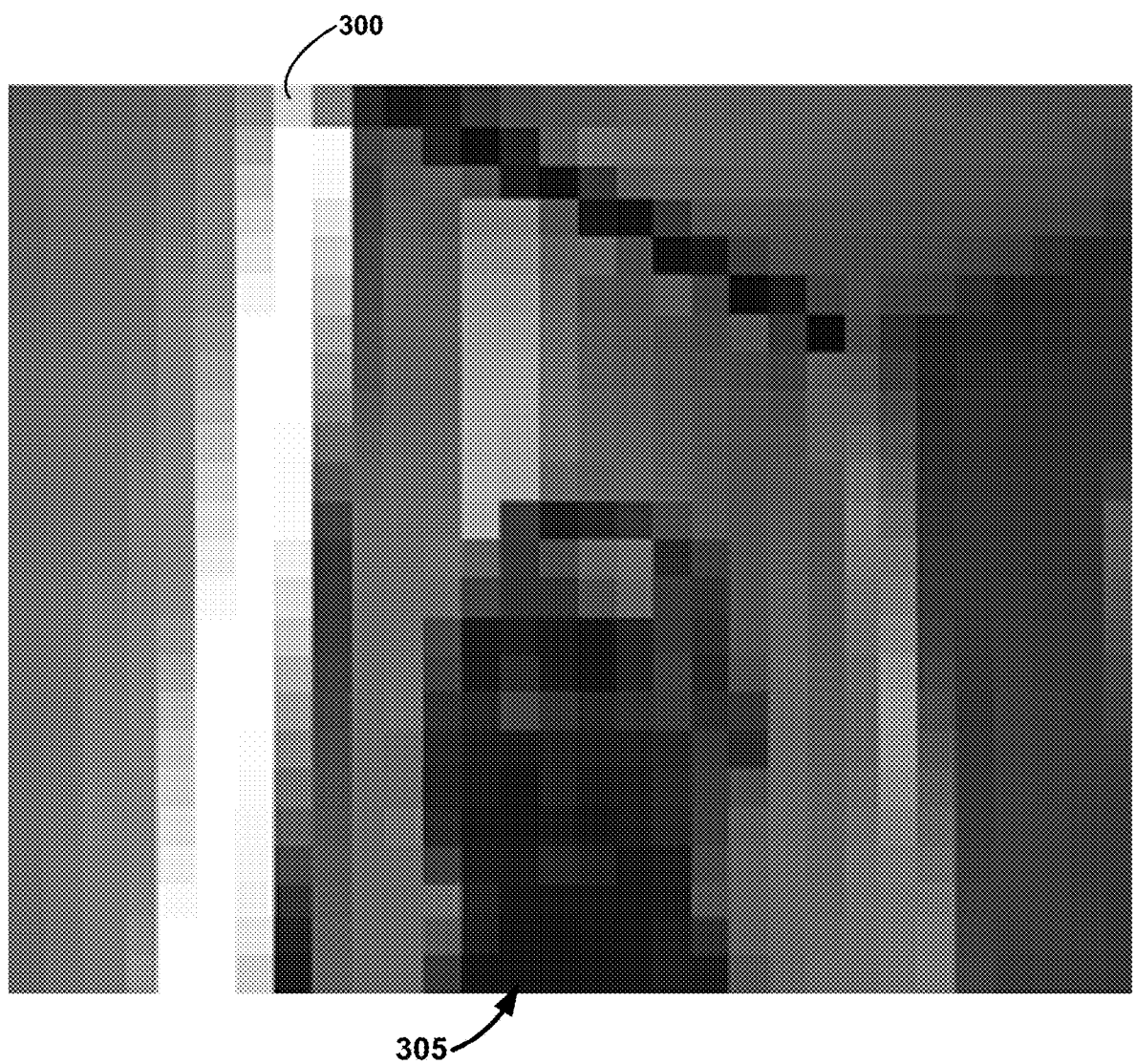
FIG. 3B shows an example in which each pixel in the original image shown in FIG. 3A has been aggregated into superpixels.

FIG. 3A shows an example of an original image. FIG. 3B shows an example in which each pixel in the original image shown in FIG. 3A has been aggregated into superpixels. In this example, the superpixels 300 are square. In other examples, the superpixels 300 may have other shapes, such as non-square rectangles. According to one such example, the superpixels 300 are rectangular and include 16 pixels along one axis of the superpixel and 12 pixels along a perpendicular axis of the superpixel. However, in other implementations the superpixels 300 may include different numbers of pixels and/or different shapes.

According to some implementations, there may be more or fewer superpixels per image than the number of superpixels shown in FIG. 3B. In some implementations, there may be only 100 superpixels per image. However, alternative examples may involve aggregating image pixels into 80, 90, 110, 120, 130, 140, 150 superpixels, or more than 150 superpixels. The number of image pixels to be aggregated in each superpixel may depend on various factors, such as a desired resolution, the number of image pixels in the sensor, power consumption considerations, etc. Relatively larger superpixels (and/or a relatively smaller number of superpixels) may, for example, be better for avoiding false positives of some kinds, such as branches moving in the wind. Moreover, reducing the number of superpixels can reduce the computational overhead and power consumption. However, having a relatively larger number of superpixels can improve image quality. In the examples shown in FIGS. 3B-6, image pixels were aggregated into hundreds of superpixels in order to maintain some similarity, observable by a human viewer, between the original image and the superpixel-based images.

In some examples, the aggregation of pixels into superpixels may be performed by hardware, e.g., hardware of the optical sensor. For example, the aggregation of pixels into superpixels may be performed in hardware by combining the charges accumulated by each pixel of a superpixel and making one measurement of the total value. The aggregation of pixels into superpixels may be performed via software by evaluating the charges accumulated by each pixel of a superpixel, or by evaluating the charges accumulated by groups of pixels within a superpixel, and then adding together the corresponding values. Such examples have the potential advantage of reducing computational overhead and the corresponding power consumption of the optical sensor and/or of a control system in communication with the optical sensor. However, in alternative implementations the aggregation of pixels into superpixels may be performed by a control system according to instructions (e.g., software) stored on one or more non-transitory media. Such non-transitory media may include memory devices such as those described herein, including but not limited to random access memory (RAM) devices, read-only memory (ROM) devices, etc.

As noted above, background subtraction may be based on detected image changes between a current frame and a reference frame, which may also be referred to herein as a background model. The image changes may correspond to moving objects. The background model may be a representation of a static version of at least a portion of a scene, with no moving objects.

The background model may be updated in order to capture changes in the lighting conditions of at least a portion of the scene, scene layout changes, etc. Accordingly, some implementations may involve updating a reference frame based, at least in part, on pixel values or superpixel values obtained for at least a portion of the scene. Examples of indoor scene layout changes may include window shades being raised or lowered, furniture being moved, etc. Examples of outdoor scene layout changes may include movement of a previously-parked vehicle, a newly-parked vehicle, etc.

Figure 4:
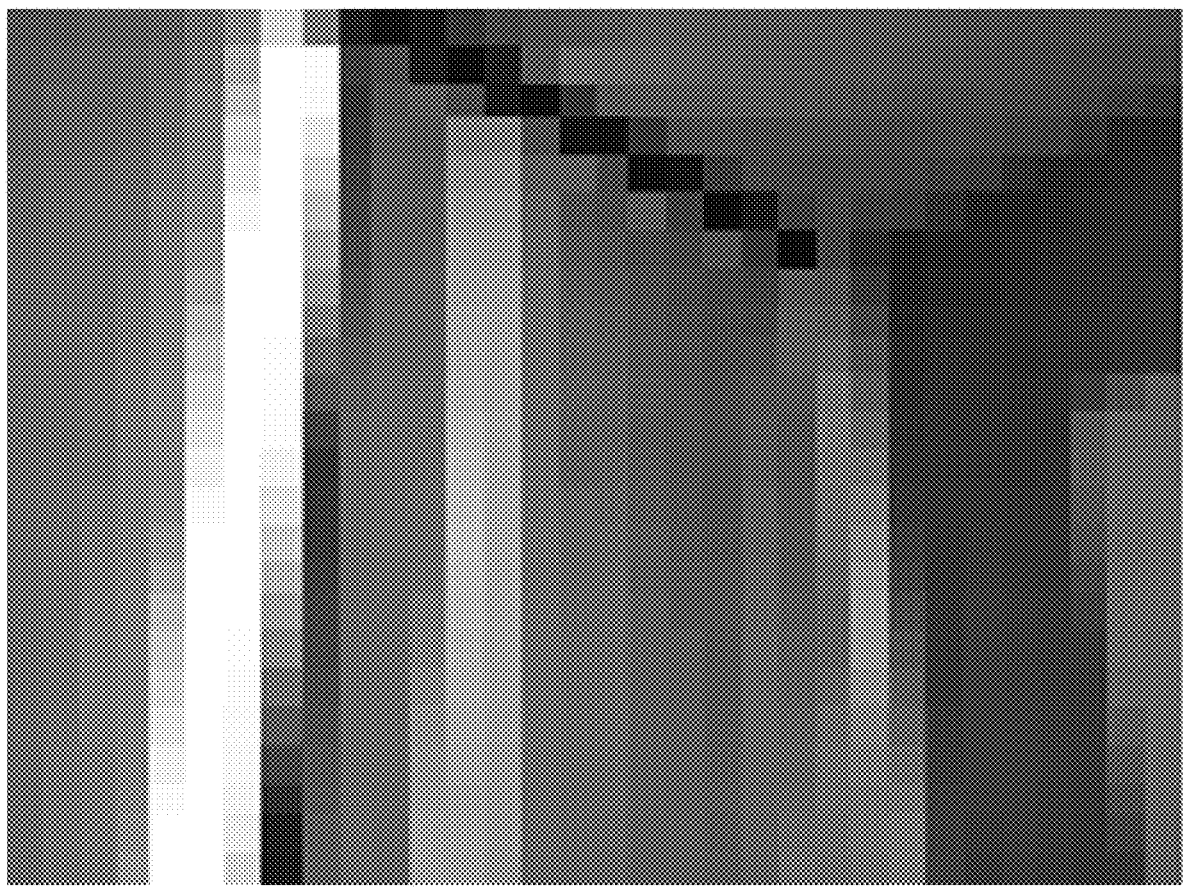
FIG. 4 shows an example of an image corresponding to a background model.

FIG. 4 shows an example of an image corresponding to a background model. In this example, the background model is a reference frame that was created before the head 305, shown in FIG. 3B, was part of the image.

According to the implementation shown in FIG. 2, block 215 involves obtaining a background model corresponding to each exposure level. As noted above, the background model may be a representation of a static version of at least a portion of a scene. According to some such examples, block 215 may involve a control system obtaining, from a memory device, a background model corresponding to each exposure level. In this example, block 220 involves comparing the superpixel values corresponding to each exposure level with the background model corresponding to each exposure level to obtain an image change detection result for each exposure level.

In some multiple-exposure implementations, the superpixel values for each exposure may be compared to a different background model for image change detection, with each background model corresponding to a particular exposure level. For example, there may be a background model corresponding to an overexposed level, a background model corresponding to an underexposed level and a background model corresponding to an intermediate or baseline exposure level. In some multiple-exposure implementations, pixel values for only a portion of a scene may be obtained in block 205. In some such implementations, a background model for only a corresponding portion of the scene may be obtained in block 215.

In alternative implementations, the superpixel values for each overexposure or underexposure may be compared to modified versions of the same background model for image change detection. For example, block 215 may involve modifying the superpixel values of a background model corresponding to a baseline exposure level by applying a constant, or a function, to obtain the superpixel values of a background model corresponding to one or more overexposed levels. According to some such implementations, block 215 may involve applying a different constant or function to the superpixel values of the background model corresponding to the baseline exposure level in order to obtain the superpixel values of a background model corresponding to one or more underexposed levels.

Obtaining image data at multiple exposure levels has some potential benefits. As noted above, there may be no single setting of a simple, low-power optical sensor that will provide a sufficient dynamic range for detecting image changes in very bright and/or very dark regions. Such regions may be too bright (or too dark) to allow values above (or below) the background model by the threshold. Therefore, some foreground events may not be detectable by using prior art methods.

Figure 5A:
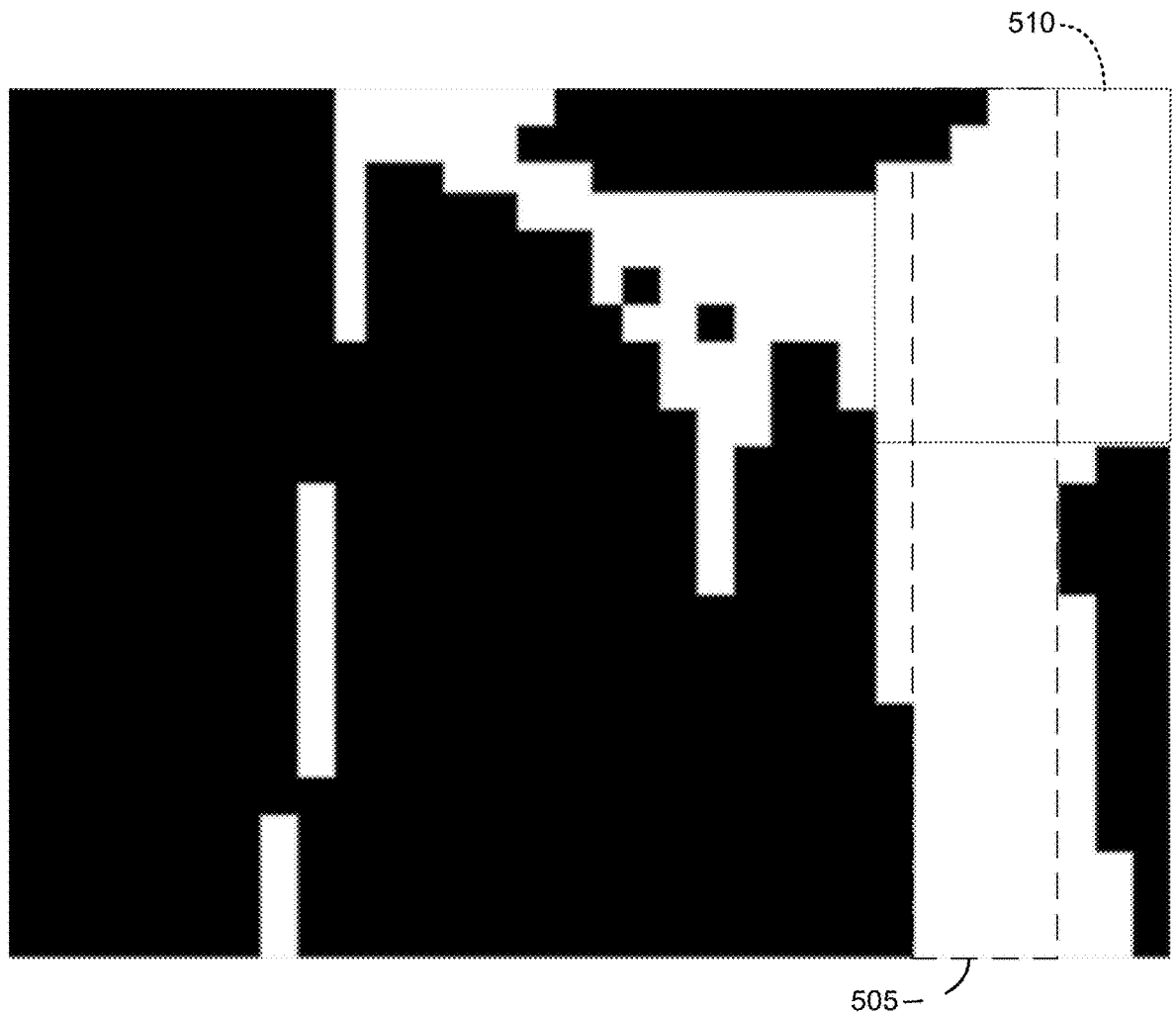
FIG. 5A shows examples of superpixels in the background image of FIG. 4 for which detection of dark objects may be problematic.

FIG. 5A shows examples of superpixels in the background image of FIG. 4 for which detection of dark objects may be problematic. The white areas in FIG. 5A, in this example, show the superpixels in the background model of FIG. 4 that may be too dark to allow detection of darker objects when image data are obtained for the scene at a baseline exposure level. However, darker objects may be detected in these areas by obtaining image data for at least a portion of the scene at one or more "overexposed" exposure levels.

Figure 5B:
FIG. 5B shows examples of superpixels in the background image of FIG. 4 for which detection of bright objects may be problematic.

FIG. 5B shows examples of superpixels in the background image of FIG. 4 for which detection of bright objects may be problematic. The white areas in FIG. 5B show the superpixels in the background image of FIG. 4 that may be too bright to allow detection of brighter objects when image data are obtained for the scene at a baseline exposure level. Nonetheless, brighter objects may be detected in these areas by obtaining image data for at least a portion of the scene at one or more "underexposed" exposure levels.

In some instances, obtaining image data at multiple exposure levels also may allow for more sensitivity to image changes even for areas of the background image in the middle range, such as those areas that are not shown as white in FIG. 5A or FIG. 5B. Therefore, additional image changes (as compared to the image changes detected using only one exposure level) may be detected by obtaining image data for the same scene at one or more overexposed or underexposed exposure levels. Accordingly, obtaining image data at multiple exposure levels may provide a more reliable image change detection process, particularly if the scene includes a relatively wide range of light intensity.

As noted above, the blocks of FIG. 2 and of methods disclosed herein are not necessarily performed in the order indicated. For example, in some implementations method 200 may involve obtaining first pixel values for at least a portion of a scene at a first exposure level in block 205, aggregating the first pixel values into first superpixel values in block 210, then obtaining a background model for that exposure level in block 215. In some such implementations, method 200 may involve obtaining pixel values for at least a portion of the scene at a second exposure level in block 205, aggregating the second pixel values into second superpixel values in block 210, then obtaining a background model for that second exposure level in block 215. Some such examples may involve obtaining pixel values for at least a portion of the scene at a one or more additional exposure levels in block 205, aggregating the pixel values into superpixel values in block 210, then obtaining a background model for each of the one or more additional exposure levels in block 215.

According to some examples, a determination may be made as to whether to obtain pixel values for at least a portion of the scene at more than a single exposure level, such as the first exposure level. Some such implementations are described below with reference to FIG. 7.

Some implementations may involve comparing the superpixel values corresponding to each exposure level with a background model corresponding to each exposure level to obtain an image change detection result for each exposure level. The "image change detection result" may include zero, one or more than one area of detected image change(s). In some examples, each instance of a change of more than a threshold amount, relative to the corresponding background model, will be regarded as an area of detected image change(s).

As noted above, in one example block 220 of FIG. 2 involves comparing the superpixel values corresponding to each exposure level with the background model corresponding to each exposure level to obtain an image change detection result for each exposure level. According to some examples, block 220 may be performed in successive frames, using a different exposure/gain level for each frame. In some alternative examples, block 220 may be performed multiple times during the same frame, using a different exposure/gain level for each instance.

Various methods of image change detection may be used, depending on the particular implementation. For implementations involving a low-power optical sensor and/or an optical sensor having a relatively low bit width, simple methods of background subtraction may be preferable. According to some such methods, a current superpixel may be considered to be part of the foreground if the difference between a light intensity value obtained by a superpixel and a light intensity value of a corresponding superpixel of the background model is greater than or equal to a threshold value. However, other implementations may employ alternative background detection methods. For example, some alternative implementations may use running Gaussian average background detection methods, temporal median filter background detection methods, kernel density estimation background detection methods, etc.

Figure 6:
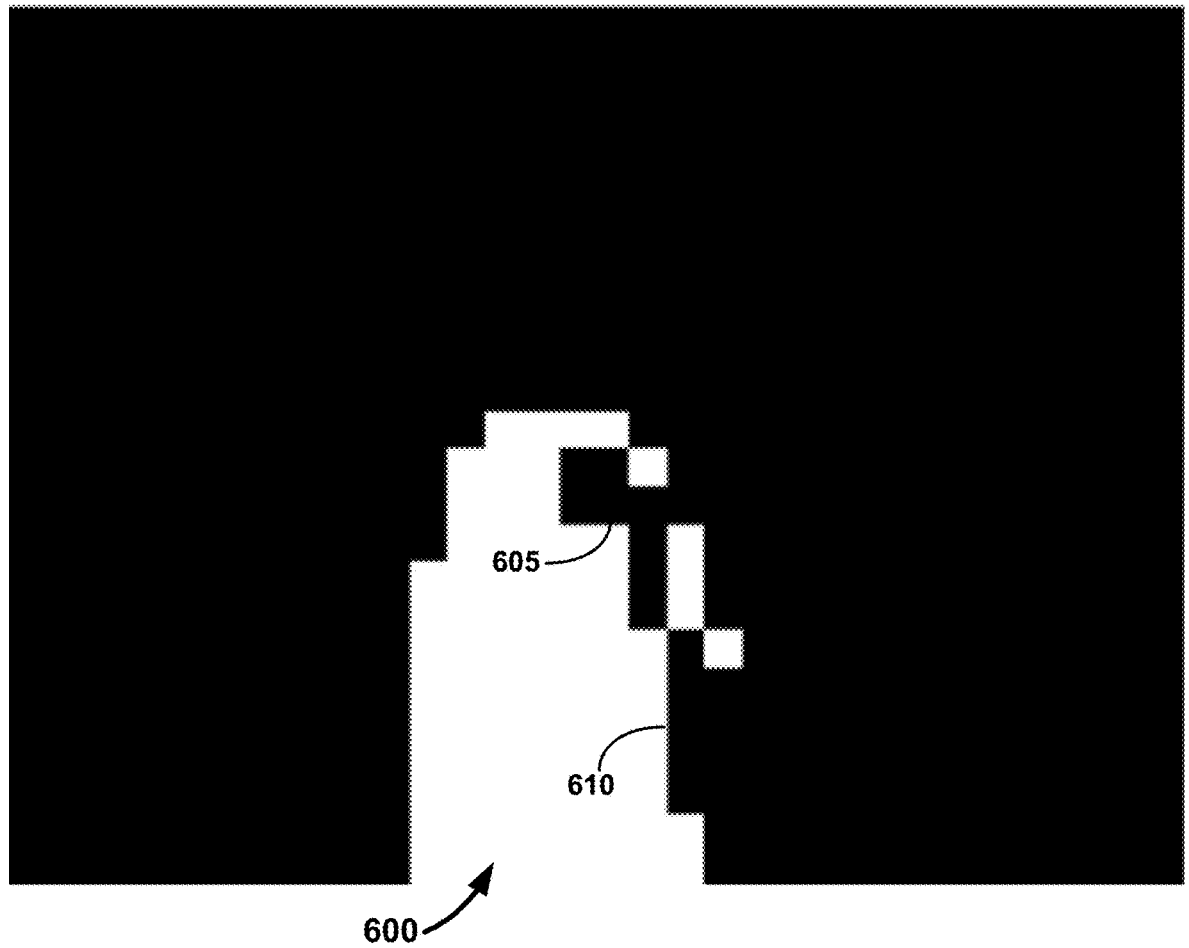
FIG. 6 shows an example of an image change region.

FIG. 6 shows an example of an image change region. In this example, the image change region 600 is shown in white. Here, the image change region 600 has been determined by comparing superpixel values of a background model for a single exposure level, corresponding to the image shown in FIG. 4, with superpixel values corresponding to the image of FIG. 3B. In this instance, the superpixel values for the image of FIG. 3B correspond to the same exposure level as the superpixel values of the background model. In this example, the image change region 600 includes multiple image change detection results, each of which corresponds to a white superpixel of the image change region 600.

Returning again to FIG. 2, block 225 involves aggregating the image change detection results for each exposure level to obtain a combined image change detection result. In some examples, the areas of detected image change(s) for each exposure level may be combined to produce the combined image change detection result. Background and/or foreground regions of the scene may be determined according to the combined image change detection result. Accordingly, in this example block 230 involves determining at least one region of interest or at least one background region for the scene according to the combined image change detection result.

Referring again to FIG. 6, it may be seen that the image change region 600 surrounds area 605, within which there was not a sufficiently large difference between the corresponding superpixels and the background model for an image change to have been detected in this example. Area 605 corresponds to reflective areas of the head 305, which are shown in FIG. 3B. Image change detection results for this reflective area—and possibly other reflective areas of the head 305, such as the reflective areas that correspond with the area 610 of FIG. 6—may be obtained by obtaining pixel values at a relatively more underexposed exposure level, as compared to the exposure level used to obtain the results shown in FIG. 6, and then performing the operations of blocks 210 through 220 of FIG. 2.

If the image change detection process based on a relatively more underexposed exposure level is successful, the area 605 and/or the area 610 of FIG. 6 may be image change detection results of this process. Block 225 of FIG. 2 may involve aggregating the area 605 of FIG. 6 and/or the area 610 of FIG. 6 with the image change region 600. Block 230 of FIG. 2 may involve determining a region of interest that includes the image change region 600 of FIG. 6, the area 605 and/or the area 610.

Some implementations may involve updating at least one of the exposure levels based, at least in part, on pixel values obtained for the region of interest. In the foregoing example, some such implementations may involve updating at least one of the exposure levels based, at least in part, on pixel values obtained for the area 605 of FIG. 6 and/or the area 610 of FIG. 6.

Some examples may involve using only a portion of the total number of pixel or superpixel values for one or more exposures. Obtaining the image change detection result for at least one of the exposure levels may, for example, involve using only a portion of a total number of superpixel values for a corresponding exposure level. In some such examples, image data for different areas of a scene may be obtained using different exposure levels. In some instances, multiple exposure levels may be used for the same image. In some such implementations, a background model for only portions of the scene (e.g., portions corresponding to areas in which pixel values are obtained for each exposure level) may be obtained in block 215.

For example, referring again to FIG. 5A, some implementations may involve obtaining image data from area 505 at one exposure level (or multiple exposure levels) and obtaining image data from other portions of the scene at one or more other exposure levels. Some examples may involve obtaining image data from area 510 at one exposure level (or multiple exposure levels) and obtaining image data from other portions of the scene at one or more other exposure levels. The exposure levels for areas 505 and 510 may, for example, be one or more "overexposed" exposure levels as compared to a baseline exposure level for the scene, or for the rest of the scene. Relatively darker objects may be detected in areas 505 and 510 by obtaining image data for the scene at the "overexposed" exposure levels. According to some such implementations, the times during which image data are obtained at multiple exposure levels may overlap. For example, image data may simultaneously be obtained from area 505 and/or 510 as well as other areas of the scene (e.g., from the entire scene represented in FIG. 5A). However, in some such examples image data may be obtained from area 505 and/or 510 for a longer period of time, as compared to the period of time used to obtain image data from other areas of the scene.

In some instances, such as an optical sensor that is positioned outdoors, lighting may vary even more significantly than in the foregoing indoor examples. The sun may illuminate at least a portion of the scene during daylight hours, whereas another strong light source may illuminate the scene at night. The scene also may nonetheless include one or more dark regions, such as an alleyway, a shaded area, etc.

Accordingly, a user may have a priori knowledge regarding bright and dark regions of a scene. In addition, a user may have a priori knowledge regarding other salient regions, such as a region of the scene corresponding with a door or window that may be a likely place for an authorized or unauthorized entry into a home.

In some examples, an apparatus may be configured for obtaining salient region data regarding one or more regions of the scene. Obtaining the salient region data may, for example, involve obtaining ambient light intensity information and/or region of interest information. For example, a user interface of a smart phone or another type of device may be used to capture salient region data from a user. In some such examples, a user may indicate salient region data by interacting with a touch screen while an image of the scene is being displayed. Some such examples may involve adjusting at least one exposure level according to the salient region data. For example, if the salient region is a dark region, darker objects may be detected in these areas by obtaining image data for the scene at one or more "overexposed" exposure levels.

According to some implementations, a control system of a device configured for communication with the optical sensor, rather than a control system of the optical sensor, may be configured to perform the image change detection functionality. Such implementations may allow the optical sensor to minimize power consumption and may not require the optical sensor to have the processing capabilities and/or memory needed for performing the image change detection functionality.

In some such examples, some blocks of FIG. 2 may be performed by the optical sensor 105 and other blocks of FIG. 2 may be performed by the control system 110, or by a control system of another device. For example, blocks 205 and 210 may be performed by the optical sensor 105 and blocks 215-230 may be performed by the control system 110, or by a control system of another device.

According to some implementations, the aggregation of pixels into superpixels may be performed by a device other than the optical sensor 105. For example, the aggregation of pixels into superpixels may be performed by the control system 110, or by a control system of another device. In some such examples, the aggregation of pixels into superpixels may be performed by software running on a device configured for communication with the optical sensor, rather than by the optical sensor. According to some such examples, block 205 of FIG. 2 may be performed by the optical sensor 105 and blocks 210-230 may be performed by the control system 110, or by a control system of another device.

Some examples may involve sending an alarm message and/or an image responsive to the combined image change detection result. For example, in the example described above with reference to FIGS. 3B and 6, in some implementations a control system of a device may be configured to transmit an image to an owner of the device. In one such example, the image may include a region of interest that corresponds with the head 305 of FIG. 3B. In one implementation, the control system 110 may cause a text message, including the image, to be sent to a telephone number associated with the owner of the device or to a telephone number associated with another person. According to some examples, a control system may cause an alarm message and/or an image responsive to the combined image change detection result if at least a portion of the combined image change detection result is within a predetermined salient region.

Figure 7:
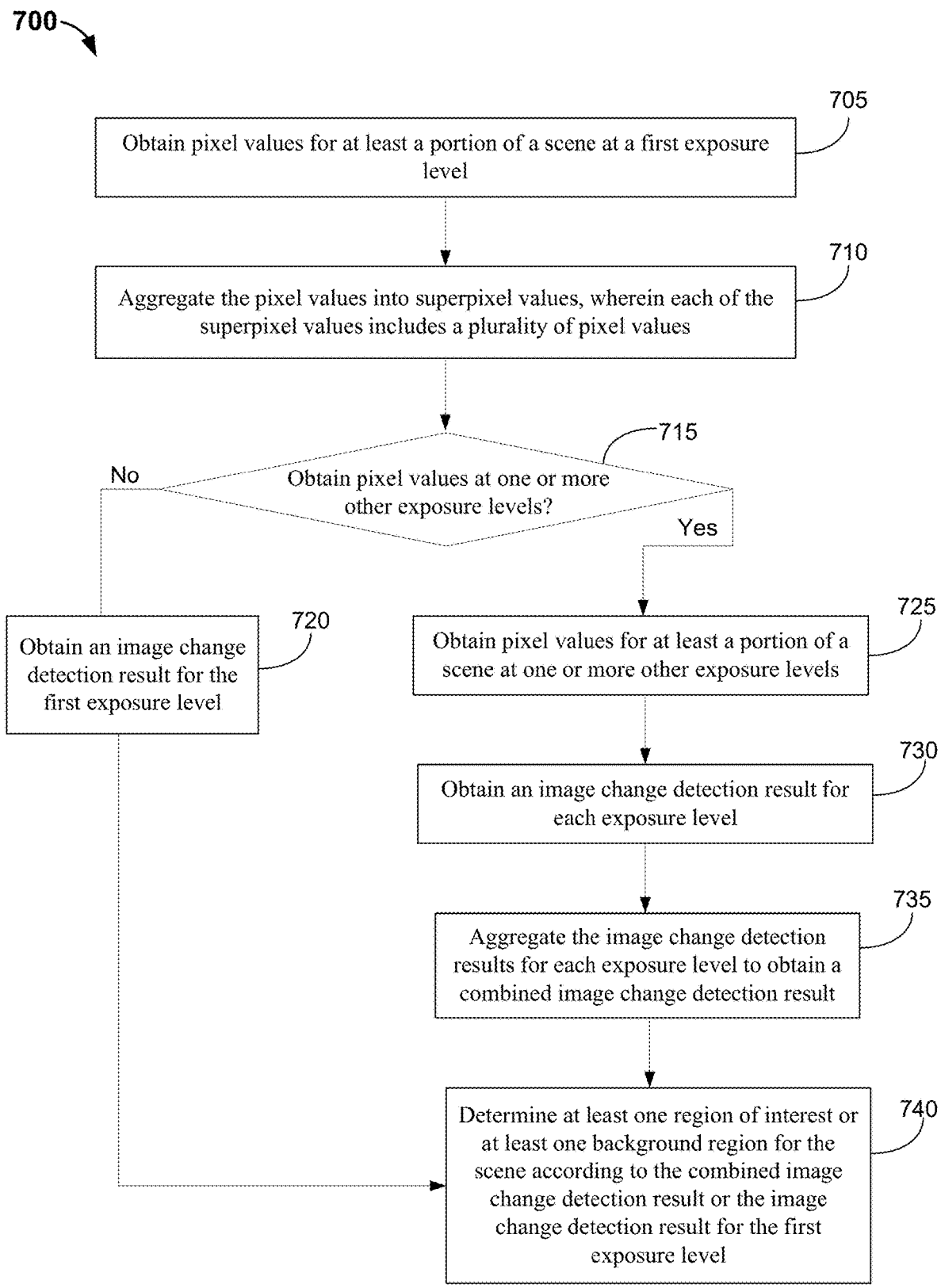
FIG. 7 is a flow diagram that provides examples of operations according to some disclosed methods.

FIG. 7 is a flow diagram that provides examples of operations according to some disclosed methods. The blocks of FIG. 7 may, for example, be performed by the apparatus 100 of FIG. 1, by a similar apparatus or by a system that includes one or more such devices. As with other methods disclosed herein, method 700 may include more or fewer blocks than indicated. Moreover, the blocks of methods disclosed herein are not necessarily performed in the order indicated.

According to this example, block 705 involves obtaining pixel values for at least a portion of a scene at a single exposure level, which is referred to as a "first" exposure level in FIG. 7. As noted above, the term "exposure" may refer to an exposure time interval, an applied gain or a combination of an exposure time interval and an applied gain. Here, the pixel values are aggregated into superpixel values in block 710.

In this implementation, block 715 involves determining whether to obtain pixel values at one or more other exposure levels for at least a portion of the scene. According to some examples, block 715 may involve determining whether conditions such as those described above with reference to FIG. 5A or FIG. 5B may be present. For example, block 715 may involve determining whether there are one or more portions of the scene for which detection of dark objects may be problematic and/or determining whether there are one or more portions of the scene for which detection of bright objects may be problematic. According to some examples, block 715 may involve determining whether a light intensity level, such as an ambient light intensity level, has changed. In some examples, block 715 may involve determining whether an image change has been detected, e.g., determining whether an image change has been detected within a predetermined time interval. According to some implementations, block 715 may involve determining whether salient region data have been received regarding one or more regions of the scene.

In this example, if it is determined in block 715 that pixel values at one or more other exposure levels should not be obtained for at least a portion of the scene, an image change detection result is obtained for the first exposure level in block 720. For example, block 720 may involve obtaining a background model corresponding to the first exposure level and comparing superpixel values of the background model to superpixel values obtained for the first exposure level.

However, according this example, if it is determined in block 715 that pixel values at one or more other exposure levels should be obtained for at least a portion of the scene, these pixel values are obtained in block 725. According to this implementation, an image change result is obtained for each exposure level in block 730. For example, block 730 may involve obtaining a background model corresponding to each exposure level and comparing superpixel values of the background model to superpixel values obtained for each exposure level. In this example, block 735 involves aggregating the image change results for each exposure level to obtain a combined image change detection result. Here, block 740 involves determining at least one region of interest or at least one background region for the scene according to the combined image change detection result or the image change detection result for the first exposure level.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. A method of image change detection, comprising:
   obtaining pixel values for at least a portion of a scene at two or more different exposure levels, each exposure level corresponding to at least one of an exposure time interval or an applied gain value;
   aggregating the pixel values for each exposure level into superpixel values;
   obtaining a background model for each exposure level, the background model corresponding to at least a portion of the scene;
   comparing the superpixel values corresponding to each exposure level with the background model corresponding to each exposure level to obtain an image change detection result for each exposure level;
   determining at least one region of interest or at least one background region for the scene according to the image change detection results; and
   updating at least one of the exposure levels based, at least in part, on the at least one region of interest or the at least one background region.

2. The method of claim 1, wherein obtaining the image change detection result for at least one of the exposure levels involves using only a portion of a total number of superpixel values for a corresponding exposure level.

3. The method of claim 1, further comprising obtaining salient region data regarding one or more regions of the scene and adjusting at least one exposure level according to the salient region data.

4. The method of claim 3, wherein obtaining the salient region data involves obtaining at least one of ambient light intensity information or region of interest information.

5. The method of claim 1, wherein obtaining the pixel values comprises obtaining the pixel values from an optical sensor.

6. The method of claim 1, wherein obtaining the background model comprises obtaining the background model from a memory device.

7. The method of claim 1, wherein the background model comprises at least a portion of a reference frame.

8. The method of claim 7, further comprising updating at least a portion of the reference frame based, at least in part, on pixel values obtained for at least a portion of the scene.

9. The method of claim 1, wherein updating the at least one of the exposure levels is based, at least in part, on pixel values obtained for at least a portion of the scene.

10. The method of claim 1, wherein the determining involves determining a region of interest, wherein updating the at least one of the exposure levels is based, at least in part, on pixel values obtained for the region of interest.

11. The method of claim 1, further comprising sending at least one of an alarm message or an image responsive to the image change detection result.

12. The method of claim 1, wherein obtaining the pixel values involves obtaining pixel values for at least a portion of the scene at a first exposure level, further comprising determining that pixel values should be obtained at one or more other exposure levels.

13. A system, comprising:
a memory; and
a processor coupled to the memory and configured to:
obtain pixel values for at least a portion of a scene at two or more different exposure levels, each exposure level corresponding to at least one of an exposure time interval or an applied gain value;
aggregate the pixel values into superpixel values;
obtain a background model for each exposure level, the background model corresponding to at least a portion of the scene;
compare the superpixel values corresponding to each exposure level with the background model corresponding to each exposure level to obtain an image change detection result for each exposure level;
aggregating the image change detection results for each exposure level to obtain a combined image change detection result; and
determine at least one region of interest or at least one background region for the scene according to the image change detection results; and
update at least one of the exposure levels based, at least in part, on the at least one region of interest or the at least one background region.

14. The system of claim 13, wherein obtaining the image change detection result for at least one of the exposure levels involves using only a portion of a total number of superpixel values for a corresponding exposure level.

15. The system of claim 13, wherein the control system is configured to obtain salient region data regarding one or more regions of the scene and to adjust the at least one exposure level according to the salient region data.

16. The system of claim 15, wherein obtaining the salient region data involves obtaining at least one of ambient light intensity information or region of interest information.

17. The system of claim 15, further comprising a user interface, wherein obtaining the salient region data involves receiving the salient region data via the user interface.

18. The system of claim 13, wherein obtaining the background model comprises obtaining the background model from the memory.

19. The system of claim 13, wherein the control system is configured to update the at least one of the exposure levels based, at least in part, on pixel values obtained for at least a portion of the scene.

20. The system of claim 13, wherein the determining involves determining a region of interest and wherein the control system is configured to update the at least one of the exposure levels based, at least in part, on pixel values obtained for the region of interest.

21. The system of claim 13, further comprising an interface, wherein the control system is configured to send, via the interface, at least one of an alarm message or an image responsive to the combined image change detection result.

22. The system of claim 13, wherein the control system is configured to obtain pixel values for at least a portion of the scene at a first exposure level and determining that pixel values should be obtained at one or more other exposure levels.

23. A system, comprising:
means for obtaining pixel values for at least a portion of a scene at two or more different exposure levels, each exposure level corresponding to at least one of an exposure time interval or an applied gain value;
means for aggregating the pixel values for each exposure level into superpixel values;
means for obtaining a background model for each exposure level, the background model corresponding to at least a portion of the scene;
means for comparing the superpixel values corresponding to each exposure level with the background model corresponding to each exposure level to obtain an image change detection result for each exposure level;
means for determining at least one region of interest or at least one background region for the scene according to the image change detection results; and
means for updating at least one of the exposure levels based, at least in part, on the at least one region of interest or the at least one background region.

24. The system of claim 23, wherein obtaining the image change detection result for at least one of the exposure levels involves using only a portion of a total number of superpixel values for a corresponding exposure level.

25. The system of claim 23, wherein the means for updating is configured to update the at least one of the exposure levels based, at least in part, on pixel values obtained for at least a portion of the scene.

26. One or more non-transitory media having software stored thereon, the software including instructions for controlling one or more devices to perform a method of image change detection, the method comprising:
obtaining pixel values for at least a portion of a scene at two or more different exposure levels, each exposure level corresponding to at least one of an exposure time interval or an applied gain value;
aggregating the pixel values for each exposure level into superpixel values;
obtaining a background model for each exposure level, the background model corresponding to at least a portion of the scene;
comparing the superpixel values corresponding to each exposure level with the background model corresponding to each exposure level to obtain an image change detection result for each exposure level;
determining at least one region of interest or at least one background region for the scene according to the image change detection results; and
updating at least one of the exposure levels based, at least in part, on the at least one region of interest or the at least one background region.

27. The one or more non-transitory media of claim 26, wherein obtaining the image change detection result for at least one of the exposure levels involves using only a portion of a total number of superpixel values for a corresponding exposure level.

28. The one or more non-transitory media of claim 26, wherein obtaining the pixel values comprises obtaining the pixel values from an optical sensor.

29. The one or more non-transitory media of claim 26, wherein the determining involves determining a region of interest, wherein updating the at least one of the exposure levels is based, at least in part, on pixel values obtained for the region of interest.

30. The one or more non-transitory media of claim 26, wherein the method further comprises sending at least one of an alarm message or an image responsive to the combined image change detection result.

* * * * *